May 3, 1966 P. BASS 3,249,194

CREDIT-REGISTERING APPARATUS

Filed Oct. 2, 1964 2 Sheets-Sheet 1

INVENTORS
BY PATRICK BASS
Holcombe, Wetherill & Brisebois
ATTORNEYS

United States Patent Office 3,249,194
Patented May 3, 1966

3,249,194
CREDIT-REGISTERING APPARATUS
Patrick Bass, Primrose Hill, London, England,
assignor to R. & R. Research Limited
Filed Oct. 2, 1964, Ser. No. 401,103
Claims priority, application Great Britain, Oct. 7, 1963,
39,373/63
10 Claims. (Cl. 194—4)

This invention relates to an apparatus operated by tokens, and is advantageously applicable to apparatus for registering a credit on effective payment by tokens. The tokens would normally be paid for in advance.

The invention is particularly, though not exclusively, applicable to charging for the use of subscriber's equipment in information or entertainment systems, such as that known as pay-television, in which the reproduction of an item or programme involves a specific charge to the subscriber.

According to one aspect of the invention, there is provided token-operated apparatus comprising means for receiving a token, and means for modifying the received token in response to a personal intervention.

The invention also provides a token-operated apparatus comprising means for receiving a token and means for so stressing the received token so that a portion is removed therefrom in response to a personal intervention.

An embodiment of the invention includes apparatus which provides the registration of credit on the partial insertion of a token within it and the subsequent manual movement of the token, which results in a portion of the token being retained as a record, and alteration of the condition of an output member to register a credit. The output member in this embodiment is a shaft which is rotated by the token movement to register the credit or further credit. Thus the angular condition of the shaft denotes the state of credit. The token movement also causes a portion of its inserted end to be removed and retained in the apparatus, and for the rest of the token to be rejected. The token may be suitable for use once only, or may be usable to register credit a finite number of times, a portion being retained each time by the apparatus as a record; in either case the token eventually becomes used up and valueless.

Preferably a supply of tokens is bought by a subscriber who then uses them in registering credit in his apparatus. He may then operate a sufficient number of tokens well in advance of his needs to establish a "bank" of credit, or operate them singly when necessary for his immediate requirements.

The total credit registered over a period, whether used up or not, may be totalled by means such as a revolution counter linked via a one-way drive to compute rotations of the output member in the credit registering direction, and the total may then be compared with the number of token portions retained in the apparatus, which totals should of course tally. The credit registering output member will usually be wound back as the registered credit is being used up.

Other features and advantages of this invention will appear from the following description of a preferred embodiment thereof, taken in conjunction with the accompanying drawings, in which.

In this embodiment credit is registered by the use of a token in the form of a key made from thermosetting or thermoplastic plastic material. The key is deposited and turned in the mechanism by a personal operation, on which the inner end is stressed and removed following which a credit-registering output member is rotated.

Figure 1:
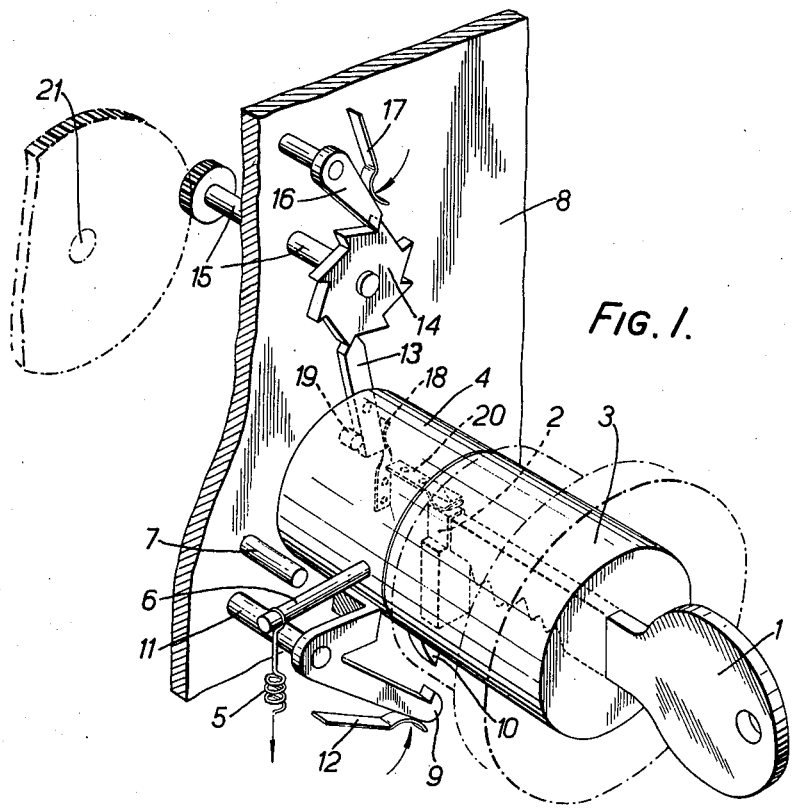
FIGURE 1 shows perspectively and in hidden detail the essential parts of a credit-registering mechanism.
Figure 2:
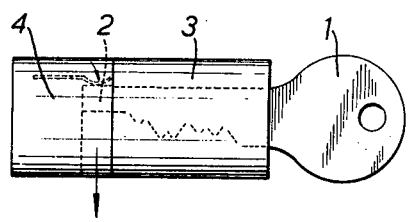
FIGURE 2 shows a side view of a detail of FIGURE 1.

Referring to FIGURES 1 and 2 the plastic key 1 having a coded tip 2 is shown already inserted into a lock barrel 3 which forms part of the mechanism. This lock barrel resembles that of a conventional lock and accordingly embodies a number of levers or tumblers which have been omitted from the sketch for clarity. The coded tip of the key projects from the end of the lock barrel into a shearing drum 4 which is in sliding contact with the lock barrel. FIGURE 2 is a side elevation of the assembly of the aforementioned items showing more clearly the relative positions of the plastic key 1, when inserted, with respect to the lock barrel 3 and the shearing drum 4. To operate the mechanism, a subscriber inserts the plastic key into the lock barrel, as shown, which positions the levers or tumblers in the lock barrel so that the barrel can be turned by means of the key in the clockwise direction. Since the coded tip 2 of the key projects into the shearing drum 4, the drum also turns in the clockwise direction with the lock barrel 3, at the same time increasing the tension of spring 5 which is attached to the shearing drum 4 by the peg 6. The shearing drum 4 continues to turn thus until the peg 6 meets the stop 7 attached to the chassis 8.

Figure 3:
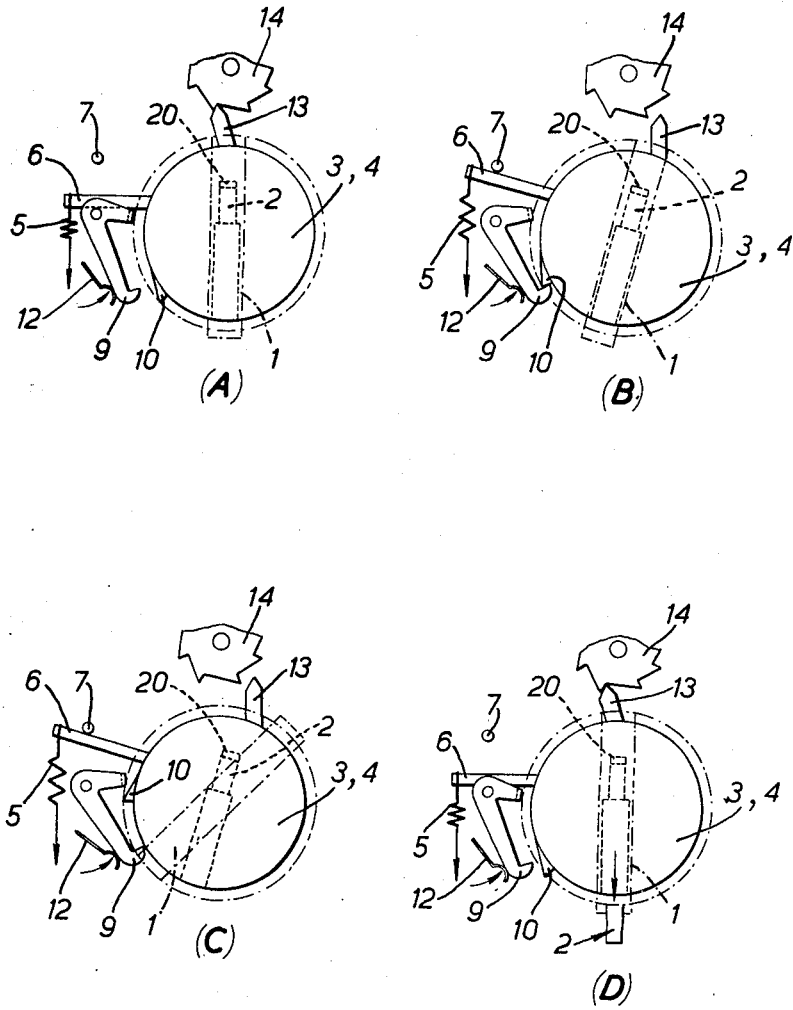
FIGURES 3A to 3D show diagrammatically front views of the mechanism of FIGURE 1 at successive stages in its operation.

The four diagrammatic views shown in FIGURES 3A to 3D, as would be seen along the axis of the lock barrel, will assist in understanding the further operation of the mechanism. FIGURE 3A shows the situation, corresponding to FIGURE 1, before the key is turned. FIGURE 3B shows the lock barrel 3 and the shearing drum 4 turned by the plastic key 1 in the clockwise direction with peg 6 against stop 7 and spring 5 fully tensioned. As the shearing drum 4 begins to turn to the position shown by FIGURE 3B, the peg 6 allows the ratchet pawl 9 to engage with the ratchet wheel 10 attached to the lock barrel 3. Only one tooth of this ratchet wheel is shown in the figures for clarity, but it should be understood that the teeth encircle the periphery of the lock barrel 3 as indicated by the brokin line in the views of FIGURE 3. The ratchet pawl 9 is secured to chassis 8 by pivot 11 and is biassed towards engagement with the ratchet wheel 10 by the leaf spring 12. The ratchet pawl and wheel thus prevent the lock barrel 3 from being turned backwards in the anti-clockwise direction. As the shearing drum 4 is turned from the position shown in FIGURE 3A to that shown in FIGURE 3B, a second pawl 13 pivoted onto the back of shearing drum 4 passes one tooth of a ratchet wheel 14 attached to the output shaft 15 of the mechanism. The ratchet wheel 14 does not move as it is passed by pawl 13 because it is prevented from doing so by another pawl 16 held permanently in engagement with ratchet wheel 14 by spring 17; pawl 13 simply rides over the tooth of the ratchet wheel 14, against spring 18, and away from stop 19. When pawl 13 has completely passed the tooth of the ratchet wheel 14, spring 18 returns the pawl 13 to its rest position against stop 19.

As the peg 6 meets stop 7, the situation shown in view B of FIGURE 3, the shearing drum 4 is prevented from turning further in the clockwise direction, but the lock barrel 3 continues to turn thus shearing off the tip 2 of the plastic key 1, as illustrated in FIGURE 3C. When this shearing action is complete, the tension of spring 5 causes the shearing drum 4 to return in the anti-clockwise direction to its rest position, and the tip 2 of the plastic key 1 is ejected from the shearing drum 4 by the leaf spring 20 into a receptacle (not shown) positioned under the mechanism. At the same time, pawl 13 engages with ratchet wheel 14 and rotates the wheel in the clockwise direction through the pitch angle of one ratchet tooth. Since the ratchet wheel 14 is attached to the output shaft 15 of the mechanism which in turn is geared to operate the registering section 21 of the pay television apparatus, the subscriber's action of inserting and turning the plastic key 1 as described above, causes the designated value of the key to be registered as credit in the pay television apparatus. The returning of the shearing drum 4 to its rest position causes peg 6 to disengage pawl 9 from ratchet wheel 10 so that the plastic key 1 may be turned with the lock barrel 3 in the anti-clockwise direction to the original position where the key, without its tip, can be withdrawn by the subscriber.

It will be evident that if a subscriber attempts to obtain further credit by inserting and turning the key a second time, he would not be successful because the tip of the key would be missing, the shearing drum would not turn and consequently no credit would be registered. Further, if he attempts to attach a counterfeit tip to a used key and thereby succeeds in registering further credit, the counterfeit tip would be ejected into the receptacle where it would remain as evidence. To thwart a subscriber who attempts to devise a means for obtaining credit without depositing anything into the receptacle, a simple counter could be attached to the output shaft of the mechanism to record the total credit which should tally with the number of key tips in the receptacle.

Many different methods may be used to mark or code the key tips so that they can be identified and distinguished from counterfeit tips. For example, a serial number code would be delineated by perforating, slitting, grooving or serrating the tips. Alternatively, raised or indented marks, letters or figures could be applied. A preferred method consists in coating or impregnating the tips with a magnetic material similar to that used in the manufacture of magnetic recording tapes. The serial number code is then recorded onto each tip in a magnetic pattern, and may be read by passing the tip under a magnetic playback head.

Although the plastic key as described may be used once only, if required the mechanism design could be plainly adapted so that the key could be used a number of times, a portion of the key tip being sheared off on each occasion until the tip had been completely removed, when the key would be fully spent.

In another embodiment of the invention the token takes the form of a disc of material such as metal, plastic or cardboard, which when inserted into a mechanism registers the specified amount of credit. A hole is punched in the disc by the mechanism, the material from the hole being deposited in the apparatus while the perforated disc is ejected.

Amongst the advantages of the key credit device described, as compared with coin-operated devices, are that payment for programmes is received in advance; the costly and risky operation of emptying coin boxes periodically is no longer necessary; the manufacturing cost of a key mechanism is appreciably less than that of a multi-coin mechanism and the key credit system can be used to provide credit corresponding to paper currency.

Another advantage of the above-mentioned embodiments is that only a small part of the token remains in the apparatus concerned after insertion while the rest of the token is ejected or in some other manner returned to the subscriber for disposal. The token is in fact expendable, it can be used once or a finite number of times only, and its actual value is only a very small proportion of the amount it represents. The retaining of the sheared off parts of the tokens serves to discourage the use of counterfeit tokens, and the retained parts may bear a distinctive identifiable marking or code, which may be applied in many different ways. As a further precaution against forgery the token may be made a complex shape and from materials having properties controlled to a precise specification. Since the part of the token which remains in the apparatus after use may be much smaller in size than the corresponding coin or coins it represents, the effective monetary storage capacity of the apparatus is considerably increased and the frequency of visits to each subscriber installation for the purpose of emptying the apparatus may be reduced accordingly.

As stated above, the invention, either as defined in the appended claims, or embodied as particularly described above, is particularly applicable to providing credit against tokens previously paid for in subscriber's pay television receiver installations. The output credit denotive, member or shaft can be used to drive in the credit direction on account state record member, which is driven in the opposite direction, utilising any credit, perhaps by a timer, metering the length of use of apparatus, or perhaps by pricing signals accompanying particular pay programmes accepted for reproduction.

However, the invention is not restricted to such applications, and can be applied to the automatic sale of any commodity, whether gas, electricity, timed use of an appliance, vehicle parking space, or use of any relay service; so the equipment controlled may be a tap, switch, etc.

Another advantageous use of this invention is in the operation of a road traffic pricing scheme. One such scheme has recently been proposed in Great Britain which calls for the setting up of restricted zones, where excessive congestion is otherwise likely, in which only authorised vehicles would be permitted against a specific charge per time spent in each zone. If the apparatus described above were used, each authorised driver could purchase a supply of tokens and would use one, or one removable portion of one, or the credit remaining registered after previous insertion of one, each time he entered a zone, either in credit registering apparatus installed at the zone entry point, or in such apparatus carried by his own, authorised, vehicle, under supervision at the entry point. In this way the use of coins, and risk of theft are substantially avoided; theft of the mutilated tokens or token portions would be pointless.

It is not necessary that apparatus according to the invention removes a portion from the tokens; the latter may be otherwise modified in some other manner to prevent its reuse.

Advantageously, however, a portion is removed in some manner such as shearing or breaking, and the removed portion is preferably coded, and retained by the apparatus, as evidence that the token had not been counterfeited. This portion may be coloured or have otherwise a distinctive appearance, it may be spectroscopically distinct, or magnetically or electrically coded, or distinctively shaped perhaps with notches or holes. Its constituents may be characteristic. One suitable constituent material is a plastics material containing a magnetic powder and a rare earth. It is not practical or necessary to check every tip removed; the fact that an occasional check can be made is usually sufficient deterrent against fraudulent counterfeiting.

What is claimed is:

1. Token operated apparatus comprising a support, a receptacle mounted on said support and provided with a recess for receiving a frangible token, said receptacle being mounted to be manually movable between a plurality of successive predetermined positions relative to said support when, but only when, a token is received in said recess, stop means carried by said support preventing movement of a portion of a token received in said recess as said receptacle and the remainder of said received token are manually moved from one of said positions to a succeeding position, so that said manual movement to said succeeding position causes separation of said token portion from the remainder of said received token, and output means for initiating a required operation, said output means being positioned to be actuated by movement of said receptacle out of said succeeding position.

2. Apparatus for operation by a frangible token, said apparatus comprising in combination a support, token receptacle means mounted on said support and including first and second portions having alignable recesses for receiving said token, said receptacle portions being mounted for coupled manual movement between first and second successive predetermined positions when said token is inserted in said alignable recesses, releasable ratchet means carried by said support preventing movement of said first receptacle portion in the reverse direction from said second to said first position when said second receptacle portion is in said second position, resilient means biasing said second receptacle portion in said reverse direction, output means coupled with said second receptacle portion for actuation thereby during movement thereof from said second to said first position to effect a required operation, and means for preventing movement of a portion of said token beyond said second position so that manual movement of said first receptacle portion beyond said second position severs said token between said first and second receptacle portions, thereby permitting movement of said second receptacle portion in response to said resilient bias to effect said required operation.

3. Token-operated apparatus as set forth in claim 2 wherein said means for preventing movement of a portion of said token comprises stop means preventing further movement of said second receptacle portion beyond said second position.

4. Token-operated apparatus as set forth in claim 2 including ratchet release means operable to release said ratchet means to permit said reverse movement of said first receptacle portion and release actuating means on said second receptacle portion which engage said release means when said second receptacle portion is in its first position, thereby permitting said reverse movement of said first receptacle portion.

5. Token-operated apparatus as set forth in claim 2 wherein said output means comprises an output shaft and unidirectional drive means coupling said output shaft to said second receptacle portion to be driven by said second receptacle portion during reverse movement thereof.

6. Token-operated apparatus as set forth in claim 2 wherein said recesses when aligned define a direction of insertion for said token, said recesses having a predetermined complex form transverse to said direction whereby only tokens of said predetermined complex form transverse to the direction of insertion can enter said recesses.

7. Token-operated apparatus as set forth in claim 2 including stop means at said first position of said receptacle portions, said first receptacle portion including detent means having a first portion entering said recess in said receptacle portion and a second portion engaging said stop means to prevent movement of said first receptacle portion, the first portion of said detent means being positioned to be engaged by a token received in said first receptacle portion to free said second detent means portion from said stop means and thereby release said first receptacle portion for movement from said first position.

8. Token-operated apparatus comprising in combination: token receptacle means including first and second cylindrical barrel portions each having an axis; means mounting said barrel portions coaxially and axially adjacent for rotation about said axis; alignable recesses in said barrel portions; ratchet teeth formed on the periphery of said first barrel portion; pawl means; spring means biasing said pawl means into engagement with said ratchet teeth to permit rotation of said first barrel portion in a predetermined direction only; first stop means defining a first position of rotation for said barrel portions; second stop means defining a position displaced from said first position in said predetermined direction; said second stop means engaging said second barrel portion to arrest movement thereof in said predetermined direction; a lever portion on said pawl means to release said pawl means from engagement with said ratchet teeth by pressure thereon; resilient means biasing said second barrel portion for rotation in the direction opposite to said predetermined direction; an arm on said second barrel portion engaging said lever portion of said pawl in said first position of said barrel portion; an output shaft mounted for rotation parallel with said axis; a ratchet wheel fixed on said shaft; further pawl means pivoted on said second portion for engagement with said ratchet wheel; further spring means biasing said further pawl means into engagement with said ratchet wheel during reverse movement of said second barrel means thereby to produce rotation of said output shaft; a frangible token insertable in said receptacle recesses with a first portion thereof contained in said recess in said first barrel portion and a second portion thereof contained in said recess in said second barrel portion to permit coupled rotary movement of said barrel portions in said predetermined direction; whereby movement of said first barrel portion past said second position while said second stop means prevents such movement of said first barrel portion serves to sever said token between said first and second portions thereby to permit reverse movement of said second barrel portion in response to said spring bias whereon said further pawl means engages said ratchet wheel to rotate said output shaft.

9. Token-operated apparatus as set forth in claim 8 in which said second barrel portion is formed with an opening leading to the recess therein and through which said severed token portion is permitted to fall when said second barrel portion is in said first position.

10. Token-operated apparatus as set forth in claim 8 wherein said first barrel portion includes detent means engaging said first stop means to prevent rotation of said first barrel portion, said token engaging said detent means to disengage said detent means from said first stop means to allow rotation thereof.

References Cited by the Examiner

UNITED STATES PATENTS

| | | | |
|---|---|---|---|
| 2,794,869 | 6/1957 | Noregaard. | |
| 3,097,347 | 7/1963 | Simjian | 194—4 |
| 3,165,187 | 1/1965 | Smith | 194—4 |

SAMUEL F. COLEMAN, *Primary Examiner.*

H. C. HORNSBY, *Assistant Examiner.*